United States Patent [19]

Schoettle, Jr.

[11] 4,262,939
[45] Apr. 21, 1981

[54] SLIDE CHART MANUFACTURE

[76] Inventor: Karl R. Schoettle, Jr., 1 Private Way, Strafford, Pa. 19087

[21] Appl. No.: 968,122

[22] Filed: Dec. 11, 1978

[51] Int. Cl.³ .............................................. B42D 15/00
[52] U.S. Cl. ................................... 283/65; 235/70 R; 493/325; 493/355
[58] Field of Search ............. 93/1 R, 61 R; 235/70 R; 283/65

[56] References Cited

U.S. PATENT DOCUMENTS

| 3,025,767 | 3/1962 | Ruffalo | 93/1 R |
| 3,441,208 | 4/1969 | Goldstein | 235/70 R |
| 3,902,656 | 9/1975 | Rothchild | 235/70 R X |
| 4,132,348 | 1/1979 | Bromberg | 235/70 R |

Primary Examiner—Paul A. Bell
Attorney, Agent, or Firm—Weiser, Stapler & Spivak

[57] ABSTRACT

A method for the manufacture of a slide chart, utilizing high speed, straight line gluing and folding machinery, from a unitary blank having a flat sheet separated into three segments, a first and second segment being provided with openings and forming the faces of the manufactured slide chart, and a third segment having scored lines longitudinally extending therethrough to form a railed slide located between the faces of the manufactured slide chart. The method comprises applying glue to the longitudinal edges of the second or third segment, folding the second and third segment onto each other, applying glue to the longitudinal edges of the first or third segment, folding the first and third segment onto each other, and trimming the transverse edges of the resulting slide chart assembly, thereby freeing the slide to move between a pair of rails and the faces of the slide chart to provide a finished slide chart of substantial precision.

31 Claims, 6 Drawing Figures

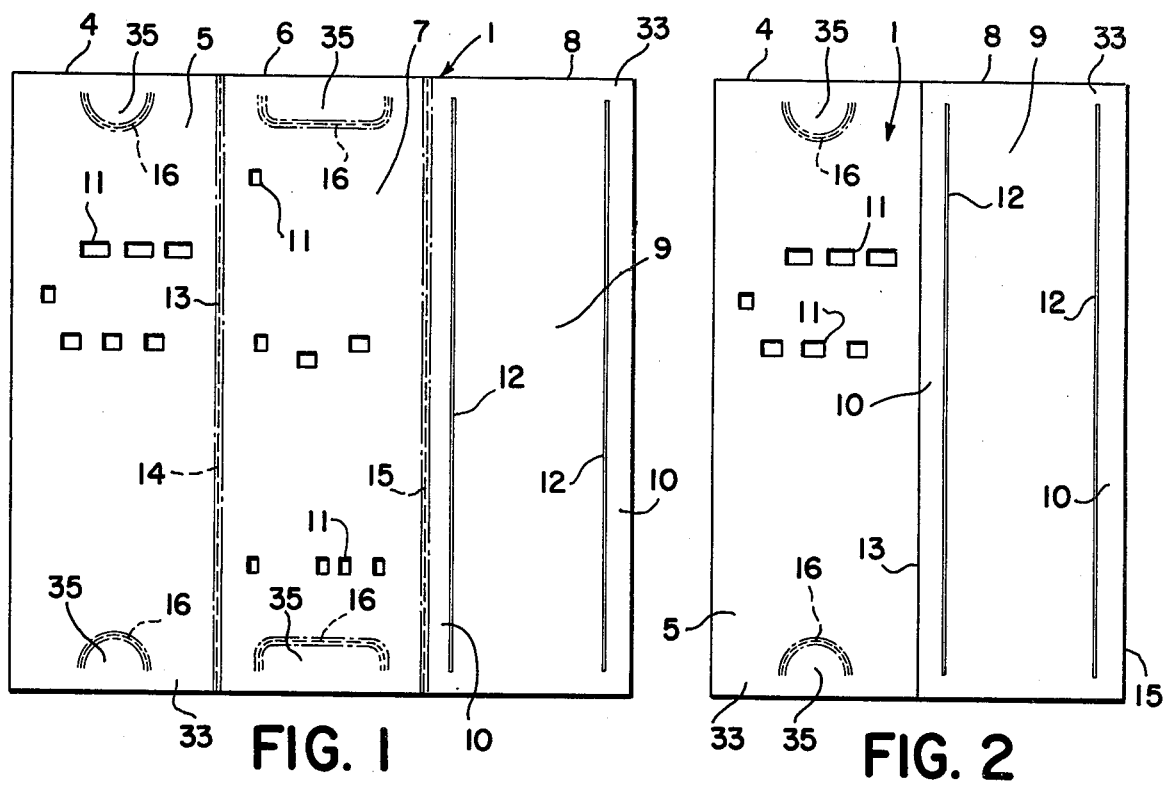
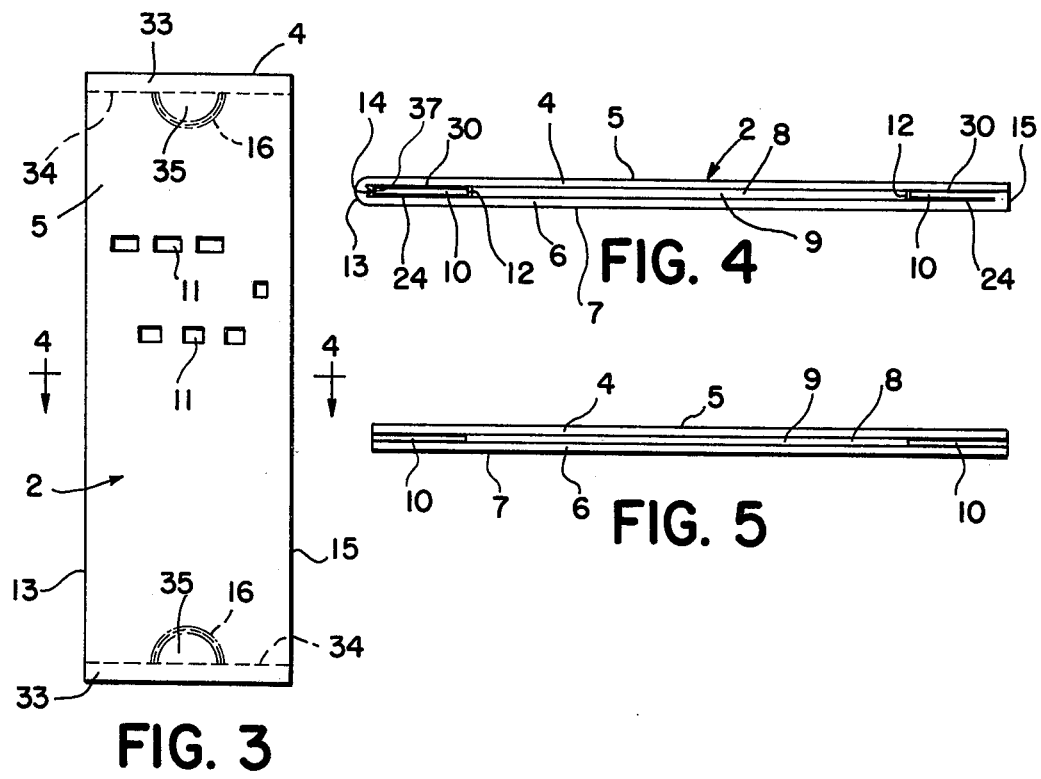

SLIDE CHART MANUFACTURE

BACKGROUND OF THE INVENTION

This invention relates to the field of slide chart manufacturing, and in particular to a method for manufacturing a slide chart from a unitary sheet blank using high speed, straight line, continuous motion gluing and folding machinery.

Slide charts have long been used as rapid and inexpensive calculation devices in a wide variety of fields. Generally, such slide charts are rectangular in shape, or circular in shape. This invention relates to the former type of slide chart.

Rectangular slide charts generally comprise two rectangular, outer faces, joined along both of their longitudinal edges, and a rectangular slide which is sandwiched in between the faces and the joined edges of the faces and which is permitted to slide within the confines of the resulting enclosure. Each of the faces and the slide is generally provided with printed material relating to the field to which the slide chart pertains. One or both of the faces are generally provided with openings through which material printed on the slide may be viewed. By aligning data contained on the slide or the faces of the slide chart, various calculations may be performed.

Such slide charts may be inexpensively manufactured, primarily from paper products, so that they may be widely distributed at a reasonable cost. Moreover, to further reduce costs of production, such slide charts are capable of formation from prefolded blanks into a finished product. An example of such a slide chart is described in U.S. Pat. No. 3,441,208, issued Apr. 29, 1969.

Although such slide charts are useful in many applications, the precision of the calculations they are capable of delivering is limited. In many, generally technical, applications the precision such a construction affords is insufficient for satisfactory results to be obtained using such a calculation device.

To improve the precision of the slide chart, workers in the art have constructed railed slide charts, similar in many respects to slide rules, which have found wide acceptance in the technical arts.

Non-railed slide charts are produced by folding two faces upon each other, sandwiching therebetween a slide forming the finished product. Irregularities in the folding and gluing of the faces has caused irregularities in the width of the slide chart produced. Consequently, the slide, in many cases, is permitted in skew slightly between the faces of the slide chart resulting in a lack of precision in calculations.

Railed slide charts are produced using a three-tiered construction. Comprising the three tiers are two faces, similar in construction to those of non-railed slide charts, and a slide which comprises two longitudinally extending rulings which form narrow strips along the longitudinal edges of the slide. In production, a first face is placed upon a surface with any data or other material printed thereon facing downward. Two narrow ribbons of glue are placed along the longitudinal edges of the first face, the width of the ribbons of glue being less than the width of the narrow strips of the slide. The slide is then placed over the first face and glued thereto along its edges. At this time care must be taken in aligning the edges of the slide with the edges of the face, to assure proper alignment of any data contained on the slide with the remainder of the slide chart. Two more ribbons of glue are then placed along the longitudinally extending strips of the slide. The second face is then placed over the slide and affixed thereto, taking care to assure proper alignment between the respective surfaces.

In manufacturing the slide of a railed slide chart, two scored lines are placed along the longitudinal edges of the slide to form the narrow strips previously mentioned. By scoring the slide for a distance less than the length of the slide the narrow strips are maintained in alignment with the slide prior to assembly of the slide chart. After assembly of the slide chart, the transverse edges of the slide chart are trimmed back a sufficient distance to free the center portion of the slide from the narrow strips of that slide. The center portion is then held between the narrow strips, which serve as rails along which the center portion may slide with improved precision. The skewing of the slide previously encountered is thereby substantially eliminated. The precision of the resulting calculation is greatly enhanced.

However, such increased precision is only obtained by increasing the complexity of manufacture of the device, causing substantial increases in the cost of producing such a slide chart. In particular, the alignment of the slide and the faces, which is generally performed by hand, presents a substantial increase in the cost of production.

This problem has been recognized by workers skilled in the art. U.S. Pat. No. 3,025,767, issued Mar. 20, 1959, illustrates a slide chart construction which attempts to overcome such alignment problems.

In that patent, a unitary slide chart blank is disclosed which is capable of being appropriately folded into a railed slide chart. Folds are located in a transverse orientation; strips of glue being located along the longitudinal edges of the blank. Alignment is enhanced by the folding process, rather than being entirely dependent upon the separate physical alignment of components.

Although such a blank enables costs of production to be reduced to a limited extent, workers in the art have continued to utilize the slower timed line manufacturing techniques to produce railed slide charts, thus limiting production speed. The folding and gluing steps required to produce a railed slide chart were not believed to be appropriate to the use of high speed folding techniques.

In particular, it was felt inappropriate to produce a folded product requiring the application of four ribbons of glue during its formation on high speed, straight line gluing and folding machinery, which had traditionally been used to form structures requiring only two ribbons, or sometimes only one ribbon, of glue. Consequently, the machinery used by workers in the art of high speed folding techniques was not believed to be applicable to the manufacture of a railed slide chart.

Accordingly, there exists a need to develop a railed slide chart which is capable of high speed alignment and production, to reduce the costs of production, without reducing or compromising the precision of such a slide chart and, therefore, its acceptance as a precision calculation device.

SUMMARY OF THE INVENTION

This invention relates to the field of slide chart manufacturing, and in particular to a method for manufacturing a railed slide chart from a unitary sheet blank using high speed, straight line, continuous motion gluing and folding machinery.

The techniques and blanks previously used to form a railed slide chart generally called for components or gluing and folding steps in which at least some of the fold lines and some of the ribbons of glue extended in more than one direction. For example, the blank illustrated in U.S. Pat. No. 3,025,767, previously mentioned, has fold lines and ribbons of glue which are perpendicular to each other. Such a configuration is not conducive to the use of high speed folding and gluing techniques.

It has been determined that, by providing a blank which has fold lines and ribbons of glue which are parallel to each other, it is possible to produce a folded, railed slide chart on high speed, straight line, continuous motion gluing and folding machinery. Moreover, this is so even though four ribbons of glue are applied to the blank during the folding operation.

In accordance with the present invention, a blank, and a method for manufacturing and finishing the blank into a railed slide chart, has been developed which permits a manufacturer to produce a railed slide chart on high speed, straight line gluing and folding machinery, using the blank of the present invention, enabling substantial reductions in both the time and cost of producing such a slide chart.

The blank of the present invention comprises a unitary, rectangular, planar sheet having three segments or areas. A first and second segment serve as the outer faces of the slide chart after folding. Such faces are provided with data or other indicia, or windows if desired, which are used to interpret the data recorded on the slide chart.

A third segment forms a railed slide for the slide chart. To this end, it is provided with scored lines along its longitudinal edges which extend for a distance less than the full length of the slide. This maintains proper alignment of the slide during manufacture of the slide chart. The center portion, which forms the slide, is generally provided with additional data or indicia which combine with the data or indicia on the faces of the slide chart to produce the required calculation.

In manufacturing the slide chart, two ribbons of glue are placed along the longitudinal edges of either the slide portion or one of the faces of the slide chart. The slide portion and the face are then folded onto each other, adhering thereto due to the presence of the glue. Subsequently, two additional ribbons of glue are placed along the longitudinal edges of either the slide portion or the second face of the slide chart. The second face and the slide portion are then folded onto each other, adhering thereto due to the presence of the glue. Finally, the lateral edges of the folded slide chart are trimmed or cut back a sufficient distance to free the slide from the rails. A finished, aligned, railed slide chart results, without requiring the tedious alignment which had previously been required in producing such a slide chart. Alignment is provided by the folding operation, rather than by physically aligning the elements of the slide chart as each element is assembled.

By removing the need to physically align the respective components of the slide chart, in accordance with the above described technique, manufacture of a railed slide chart is then capable of being accomplished using suitably adapted straight line gluing and folding machinery. A Post Model 40-C Straight Line Gluer, manufactured by the Post Machinery Company, Beverly, Massachusetts. U.S.A., suitably configured and adjusted to perform the above series of steps, has presently been found to produce railed slide charts of excellent precision. Such an apparatus comprises generally a feed section to stack and deliver blanks to the remainder of the machine, a prefold section to break the blank along its fold lines in preparation for the gluing process, a means for delivering glue to appropriate areas of the blank prior to folding, a fold section which performs the folding steps above described, and a delivery section which delivers the folded slide chart from the machine upon completion. Supportive machinery is utilized to print data upon the blank and to prepare the blank with scoring and openings prior to folding, and to trim the lateral edges from the slide chart after folding, to produce a finished product.

The folding technique embodied in the present invention could also be performed utilizing a suitably configured and adjusted straight line gluer of the following type: the model PCR 930-N straight line gluer manufactured by Bobst Champlain, Inc., Roseland, N.J.; the "speed King" Model FG straight line gluer manufactured by the International Paper Box Machine Company, Nashua, N.H.; the Diana 925-IV straight line gluer manufactured by Jagenberg USA, Inc., New York, N.Y.; or any other straight line gluing and folding machine having similar capabilities and design features.

Accordingly, it is an object of the present invention to provide a method for manufacturing a railed slide chart using high speed, straight line gluing and folding machinery.

It is another object of the present invention to provide a method for manufacturing a railed slide chart using straight line gluing and folding machinery which requires a minimum amount of adaptation of the machinery to such a process.

It is another object of the present invention to provide a unitary blank which is capable of being folded into a railed slide chart and which does not require the individual physical alignment of respective elements of the slide chart to form a slide chart having suitable precision.

These objects and others will become apparent to those skilled in the art from the following disclosure of the preferred embodiment of the invention taken in conjunction with the draawings provided in which like reference characters refer to similar parts throughout the several views provided.

BRIEF DESCRIPTION OF THE DRAWINGS

FIG. 1 is a top plan view of the preferred embodiment of a unitary blank which is capable of being folded according to the method of the present invention to form a railed slide chart.

FIG. 2 is a top plan view of the unitary blank of FIG. 1 after a first gluing and folding operation is performed.

FIG. 3 is a top plan view of the unitary blank of FIG. 1 after a second gluing and folding operation is performed.

FIG. 4 is a cross-sectional view of the folded slide chart of FIG. 3 taken along line 4—4 of that figure.

FIG. 5 is a cross-sectional view of a railed slide chart which requires physical alignment of its elements during formation viewed along a line similar in orientation to that illustrated in FIG. 4.

DESCRIPTION OF THE PREFERRED EMBODIMENT OF THE INVENTION

Figure 6:
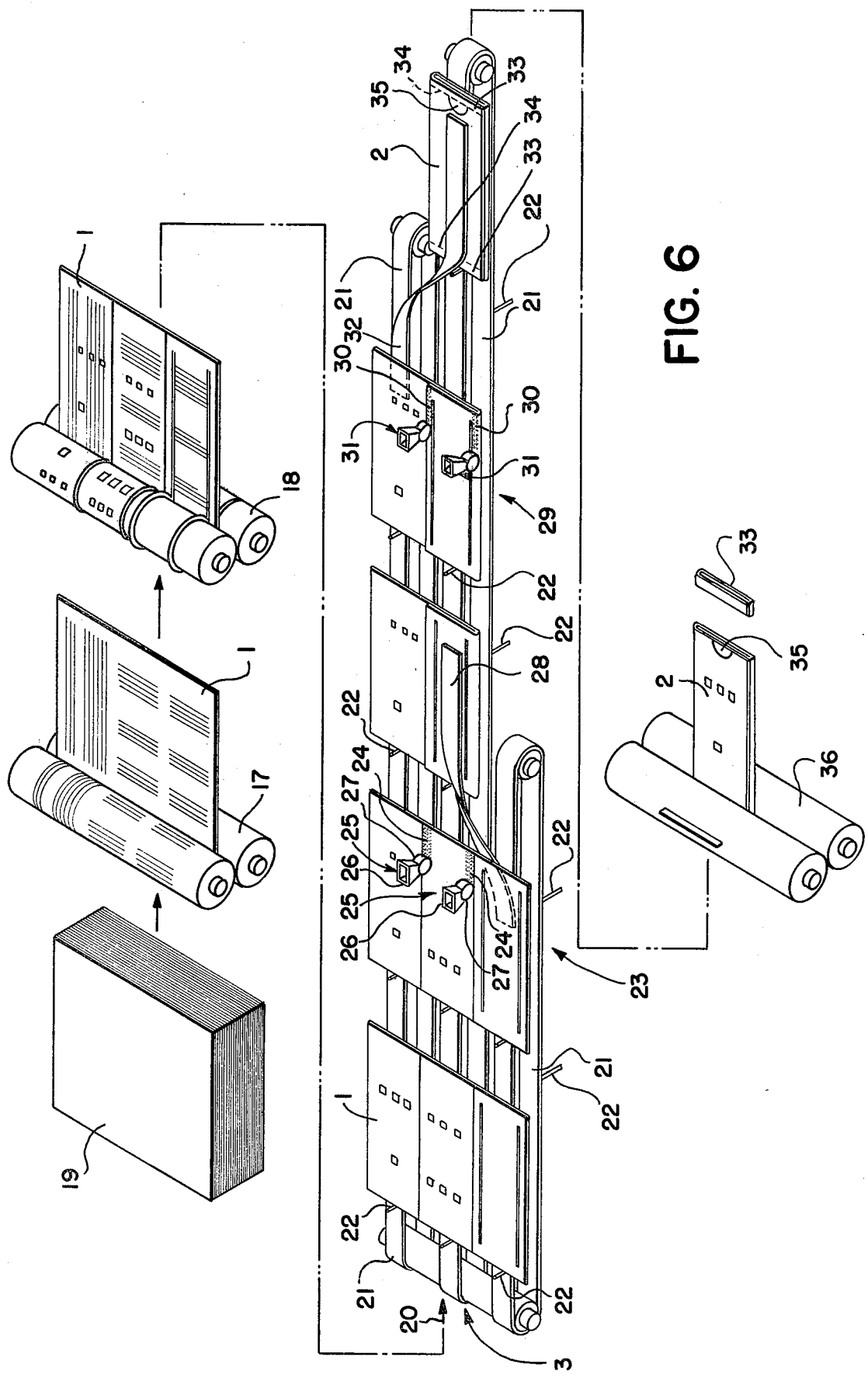
FIG. 6 is a schematic view of portions of machinery which is capable of folding and gluing a slide chart from a unitary blank in accordance with the method of the present invention.

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIG. 1 a unitary blank 1 which is capable of being folded into a precision slide chart 2 using straight line gluing and folding machinery 3 (portions of which are schematically shown in FIG. 6) in accordance with the method of the present invention, details of which will be disclosed below.

The blank 1, which would generally be formed of a paper product, a plastic, a metal sheet, or any other suitable material or blend of materials, is separated into three segments or areas, each segment forming a specified portion of the folded slide chart 2. A first segment 4 forms one of the faces 5 of the folded slide chart 2 while a second segment 6 forms the remaining face 7 of the folded slide chart 2. A third segment 8 forms the central portion of the slide chart 2, the area 9 forming the slide of the slide chart 2, the areas 10 forming the rails of the slide chart 2.

The faces 5,7 and the slide 9 are generally provided with printed material which is used to perform the calculations to be accomplished using the folded slide chart 2. This printed material would generally include ruled indicia for alignment purposes during calculations, numerical data, information indicating how to use the slide chart including instructions for use as well as identification of the variables used, illustrative matter relating to the field to which the slide chart pertains, or any other data or indicia appropriate to the use or appearance of the slide chart. Such printed material would generally, although not necessarily, only appear on the sides of the faces 5, 7 which will face outward after folding of the slide chart. Printed material would generally be placed on at least one, or both, sides of the slide 9, depending upon the nature of the slide chart 2.

The faces 5,7 are also provided with openings 11 which serve as windows in the folded slide chart 2 through which data printed on the slide 9 of the slide chart 2 may be viewed. Alignment of data printed on the slide 9, and the windows 11 of the slide chart 2, generally provides the calculation to be performed by the slide chart 2. In FIG. 1 there is shown a blank 1 having openings 11 in both faces 5, 7. It is also possible to have a blank 1 having openings 11 in only the face 5, or the face 7, depending upon the function of the slide chart being produced. It is also possible to produce a blank 1 having no openings or windows 11. In the latter case, a solid face 5,7 would be manufactured having cleared areas therein, through which data on the slide 9 may be viewed, rather than the windows 11 illustrated. Although the windows 11 illustrated are rectangular in shape, windows 11 having other shapes are also clearly possible.

The blank 1 is provided with several lines which facilitate the formation and use of the slide chart 2 as follows.

The third segment 8 is provided with two score lines 12 as illustrated. Score lines 12 are preferably cut completely through the segment 8 to facilitate separation of the slide 9 from the rails 10 in a manner to be more fully described below. Further, it is also preferred that score lines 12 do not extend the full length of the third segment 8, as illustrated. This assures that the rails 10 and slide 9 remain interconnected to an extent sufficient to maintain them in alignment during the assembly of the slide chart 2. A common strip on the order of 5 mm. at each end of the score lines 12 has been found to provide adequate results.

The first segment 4 and second segment 6 are separated from each other by a fold line 13, as illustrated, which extends the full length of the segments 4,6. Such a fold line 13 is produced by indenting locally, along the fold line 13, a portion of the material of the blank 1. Consequently, one side of the fold line will be indented slightly, while the remaining side will be provided with a bead 14 which is slightly raised from the segments 4,6. Fold line 13 serves to facilitate folding and alignment of the segments 4,6,8 during assembly of the slide chart 2 in a manner to be more fully described below.

Further to facilitate folding, the second segment 6 and third segment 8 are separated from each other by a line 15 which is cut-scored. To this end, line 15 is cut into the surface of the blank 1; however, it is cut only partially through blank 1. Consequently, segments 6,8 remain attached to each other, even though line 15 extends their entire length, however the surface is prepared for folding due to the scored portions of the line 15. A cut-score which extends approximately one-half of the way through the blank 1 has been found to permit adequate folding while also assuring that the respective segments 6,8 remain properly attached to each other.

To obtain the best results during the folding operation, as will become apparent from the discussion which will follow, it is preferable, although not necessary, to place the cut portion of the cut-scored line 15 on the side of the blank 1 opposite to that on which the bead 14 of the fold line 13 is positioned.

Faces 5,7 are further provided with score lines 16 which eventually serve to provide areas 35 at which the slide 9 may be grasped to permit use of the slide chart 2. Score lines 16 preferably extend fully through the blank 1, however, as with the score lines 12 of the third segment 8, each score line 16 is positioned so that the ends of the score line 16 do not reach the edge of the face 5,7 in which it is positioned. Again, a separation on the order of 5 mm. provides adequate results. Score lines 16 may be used which have a variety of shapes. For example, the score lines 16 of face 5 are arced in shape while the score lines 16 of face 7 are more rectangular in shape. Other shapes, as well as the type of shape used on any given face 5,7 are also clearly possible.

Having described the blank 1 used to form the slide chart 2, the method used to form the slide chart 2 on high speed, straight line gluing and folding machinery 3 will now be described.

The blank 1 illustrated in FIG. 1 is shown in condition for introduction into suitably adapted straight line gluing and folding machinery of the type previously referred to. In order to place the blank 1 in this condition certain preparatory steps are required. First, the blank 1 is provided with any printed material required. To this end, a sheet of material may be introduced into any one of a number of types of printing presses. Printing may be performed to individual sheets, each of a size on the order of the blank 1 illustrated in FIG. 1, or to large sheets of material having repetitive patterns printed thereon, and which are later cut to size as required. The latter procedure is generally preferred as being faster and therefore more economical.

Second, the printed sheets are then cut to size and scored. In this operation the borders of the blank 1 are cut, and the scored and folded lines 12, 13, 15, 16 are produced. A die cutting machine could be used to perform this function.

Also during the die cutting operation, the openings 11 which form the windows of the faces 5,7 may be formed. This cutting operation would be followed by a clearing operation, to remove material from the areas in which the windows 11 are to be provided.

The blank 1 would then be prepared for introduction into the folding and gluing machinery.

The foregoing operations may be performed separately, using for example the reciprocating printing press and die cutting machine discussed above. The resulting blanks would then be fed into the folding and gluing machinery. It is also possible to produce blanks 1 of the type illustrated using serially positioned, rotary type machinery to perform the above operations. For the printing operation, a rotary printing press could be utilized. For the cutting and scoring operation, a rotating die, rather than a die cutting machine, could be utilized. One such rotary die is illustrated for example in U.S. Pat. No. 3,479,931, issued Nov. 25, 1969. Use of rotary equipment to form the blank 1 serves to increase the rate of production, consequently reducing the overall cost of production.

As illustrated in FIG. 6, it is even possible to combine a rotary printing press 17 and a rotary die 18 of the type above mentioned with the folding and gluing machinery 3 which will be discussed below, to form an apparatus which is capable of receiving raw construction material 19 therein and which delivers folded and finished slide charts 2 therefrom at rates of production substantially in excess of those of the prior art. The cost of production is accordingly reduced.

After their preparation, blanks 1 of the type illustrated in FIG. 1 are fed into the folding and gluing machinery 3, shown at 20, for folding into a finished slide chart 2.

Upon placement into the machine 3, each blank 1 is placed on endless conveyor belts 21 having a plurality of pegs 22 capable of engaging an edge of the blank 1, thereby drawing the blank 1 along the path illustrated.

The blank 1 would then be drawn to a first gluing area 23, as shown, where a first pair of ribbons of glue 24 would be placed on the blank 1. The ribbons of glue 24 should be of a width not exceeding the distance between either of the score lines 12 and their nearest adjacent edge. This is to assure that no glue is placed on any portions of the slide 9 of the third segment 8, which would hamper movement of the slide 9 in the folded slide chart 2. The ribbons of glue 24 are preferably placed along the entire length of the segment to which they are applied.

The ribbons of glue 24 are shown as being applied to the edges of the second segment 6 of the blank 1. It would be equally possible to apply ribbons of glue 24 to the edges of the third segment 8, if desired. In either case, application of glue to the blank 1 is accomplished using glue pots 25 which form part of the straight line gluing and folding machinery. Glue pots 25 generally comprise a reservoir 26 which contains a supply of glue for use during the gluing operation, and roller-type applicators 27 which apply glue to the blank 1 as it moves beneath the rollers 27.

After glue is applied to the blank 1, the blank 1 is caused to undergo a first folding operation. To accomplish this, blank 1 is caused to pass along a metal rail 28 which serves as a guide, the curvature of which folds the third segment 8 over onto the second segment 6, finally bringing the two surfaces 6,8 into contact with each other. Contact between the respective surfaces 6,8 along those portions of the second segment 6 which are provided with glue bonds the segments 6,8 to each other. The glued segments 6,8 are then caused to pass from beneath the metal rail 28, remaining bonded together in their folded state. The resulting blank 1 would appear as illustrated in FIG. 2.

The folded and glued blank 1 illustrated in FIG. 2 is then caused to pass to a second gluing area 29. A second pair of ribbons of glue 30 are applied to the blank 1 by a second pair of glue pots 31 which operate in the same manner as did the glue pots 24 of the first gluing area 23. Again, the width of the ribbons of glue 30 is not to exceed the distance between either of the score lines 12 and the nearest adjacent edge of the third segment 8, to assure that no glue is permitted to contact the slide 9, thereby hampering its movement after folding of the slide chart 2. Glue is preferably applied along the full length of the segment to which it is applied. Although FIG. 6 shows the placement of the ribbons of glue 30 along the edges of the third segment 8, it is also equally possible to place the ribbons of glue 30 along the edges of the first segment 4, if desired.

The blank 1 is then caused to undergo a second folding operation, being passed along a second metal rail 32. Metal rail 32 engages the first segment 4 and folds it over onto the third segment 8, by drawing segment 4 along the gradually curving path defined by metal rail 32. Segment 4 and segment 8 are brought into contact, being bonded to each other along the ribbons of glue 30 placed thereon. The folded slide chart 2, which appears as illustrated in FIG. 3., is then moved out from beneath the metal rail 32, remaining glued in its folded state.

The slide chart 2 is then fully glued and folded, however it is not yet operational, since the slide 9 is still connected to the rails 10 of the slide chart 2. To finish the slide chart 2, the transverse edges 33 of the slide chart 2 are removed, or trimmed back a sufficient distance to remove those portions of the segment 8 which connect to slide 9 to the rails 10, for example, along the dotted lines 34 shown in FIG. 3. Trimming approximately 6 mm. from each transverse edge should free the slide 9 properly. This trimming operation also causes the portions 35, shown in FIG. 1, to be freed from the slide chart 2, providing areas at which the slide 9 may be grasped during use of the slide chart 2. The slide chart 2 is then fully operational.

The trimming operation above described may be performed separately from the gluing and folding machine 3, or as illustrated in FIG. 6, may be done serially with that machine 3, using a rotating die 36 of the type previously discussed. In this manner, a finished slide chart 2 may be produced from raw sheet material 19 both automatically and at high rates of production.

The foregoing discussion discloses a method for producing a slide chart 2 from a blank 1 using conventional gluing and folding machinery 3. This is made possible in two ways. First, lines 13,15 and ribbons of glue 24,30 are positioned parallel to each other, permitting the blank 1 to be folded by straight line gluing and folding machinery. Second, the need to physically align segments 4,6,8 during assembly is eliminated. Rather, alignment is provided by the proper folding of the blank 1. Fold line 13 and cut scored line 15 are provided for this purpose.

Other procedures may be used to produce the folded slide chart 2, which procedures are also in keeping with the herein disclosed inventive technique, one such example being as follows.

The blank 1, after placement into the machine 3, would first be drawn to a gluing area, which gluing area is capable of applying all four ribbons of glue 24,30 to the blank 1 as indicated previously.

The blank 1 would then be drawn to a folding area which would fold the third segment 8 over onto the second segment 6, and the first segment 4 over onto the third segment 8, as above discussed. Contact between the respective faces 4,6,8 produces a folded slide chart 2.

Other combinations of steps are also capable of being used to produce a slide chart 2 of the type herein disclosed, by suitably adapting the folding and gluing machine 3 to perform such steps. However, irrespective of the precedure used to form the slide chart 2, it is to be understood that it is the interaction between the respective segments of the blank 1 during the folding process, and not the mere folding process itself, which permits alignment, at high rates of production, of the several portions of the slide chart 2 without requiring the individual physical alignment of those several portions, which capability represents the spirit of the present invention.

Such alignment is provided by the structure of the blank 1 which is particularly adapted for use with the machine 3 as follows.

During the first folding operation, segments 6,8 are folded together. These segments are separated by cut scored line 15. Cut scoring causes the fold produced to be precise and uniform. Consequently, no physical alignment of the segments 6,8 is necessary for proper results to be obtained.

During the second folding operation, segments 4,6 are folded together. Segments 4,6 are separated by a fold line 13 to facilitate this process. The depressed portion of fold line 13 serves to assure a uniform fold is produced. Moreover, by properly positioning the bead 14 of fold line 13 so that, upon folding, it faces inwardly, alignment between the first segment 4 and third segment 8 is assured, the bead 14 just meeting the protruding edge of the third segment 8, as illustrated in FIG. 4 at 37. It is for this reason that it is preferable to place the fold line 13 and cut scored line 15 on opposite sides of the blank 1, as previously stated.

Consequently, alignment is provided, not by the physical alignment of separate structures, but by properly folding respective segments of the blank 1 along the lines 13,15 as illustrated. This could not be accomplished previously, since, as contrasted between FIG. 4 showing a cross section of the slide chart 2 of the present invention, and FIG. 5 showing a similar cross section through a slide chart requiring physical alignment during its formation, the previously mentioned structure necessary to properly align a folded slide chart 2 is not present in the latter structure, only in the former.

These structural differences become most apparent along the lateral edges of the folded slide chart 2. The edge defined by the fold line 13 will be smooth and rounded in consistency when folded. The edge defined by the cut scored line 15 will have a rough consistency, and that edge will appear continuous between the second segment 6 and the third segment 8. This structure differs from slide charts of the prior art, which generally have two edges both of which are rough, and both of which comprise three individual sections, as illustrated in FIG. 5. It is this novel structure, and the method used to glue and fold the structure, which permits a precision, rail-type slide chart to be produced utilizing suitably adapted straight line gluing and folding machinery.

It may therefore be seen that the above disclosed invention serves well to accomplish the objects previously stated. It may also be seen that the above described invention may be embodied in other specific forms in addition to those above described.

For example, as previously mentioned, during the first gluing step, it is not required that glue be applied to the second segment 6. Glue could also be applied to the third segment 8, if desired, or even to both simultaneously. Further, during the second gluing step, it is not required that glue be applied to the third segment 8. Glue could also be applied to the first segment 4, or again, to both segments simultaneously. Moreover, the segment to which glue is applied in the second gluing step is in no way dependent upon the segment provided with glue in the first gluing step.

The foregoing discussion has referred to ribbons of glue 24,30 which are placed onto the blank 1 after its introduction into the machine 3. It is also possible to produce a blank 1 provided with ribbons of glue, positioned as illustrated, which are placed in position prior to introduction of the blank 1 into the machine 3. These ribbons of glue could be a pressure sensitive glue, of the type previously described, or, if desired, could be a heat sensitive glue, which would cause respective segments 4,6,8 to adhere to each other upon the application of heat to appropriate areas of the folded slide chart 2. In the latter case, it would even be possible to apply glue to the blank 1, to then fold the slide chart 2 as above indicated, and to then apply heat to the folded slide chart 2, to form the finished, glued slide chart 2.

Moreover, as previously mentioned, the slide chart 2 may be formed of materials other than a paper product. Consequently, other types of glue may be used as well. An epoxy resin could be used to bond together segments 4,6,8 formed of a plastic. Solder could be used to bond together segments 4,6,8 formed of metal. Other means for joining together segments 4,6,8 are also clearly possible.

It is also not necessary that the three segments be positioned as illustrated in FIG. 1. The segment provided with the slide 9 could also appear on the leftmost side, or in the center, of the blank 1. However, if so, the positioning and curvature of rails 28,32 would have to be appropriately modified to assure that the slide 9 is positioned between the outer faces 5,7 during folding, forming a properly folded slide chart 2. The positioning of the fold line 13 and cut scored line 15 would also be modified accordingly. However, the configuration illustrated in FIG. 1 is preferred since all folds are performed upwardly from the plane defined by the slide chart blank 1, a condition which is better suited to the folding and gluing machinery through which the blank is to be passed.

Finally, the positioning and shape of the windows 11 and score lines 16 is not critical, and may be varied as needed for a given slide chart application.

Although the above inventive technique is discussed in connection with the production of a slide chart 2, the technique used for production of such a slide chart 2 could also be applied to other uses. For example, the slide 9 could be provided with cavities adapted to hold objects which are then capable of being dispensed as the slide 9 is withdrawn from between the faces 5,7. In this manner for example, capsules could be placed within the slide 9 for dispensing as needed. Other objects could be similarly dispensed. In such cases, the indicia and windows 11 referred to above need not be used, although such indicia and windows 11 could be used if desired. Other uses for the above described inventive technique are also possible.

It is therefore to be understood that the present disclosure has been made only by way of example and that numerous configurations may be devised to perform the essential functions of the invention disclosed. Accordingly, the scope of the invention disclosed should not be limited by the foregoing specification which should be interpreted in an illustrative and not a limiting sense.

I claim:

1. A method for producing an article of manufacture suitable for use as a slide chart from an essentially planar sheet having three adjacent segments, a first and second segment forming faces of the article of manufacture and having openings therein, and a third segment having two parallel, scored lines which extend longitudinally along the third segment for a distance less than the length of the third segment, the method comprising:

applying, along the lateral edges of at least one of the second or third segments, for a width not to exceed the distance between the outer edge of the third segment and the nearest adjacent scored line of the third segment, a means for joining together the second and third segments, folding the second segment and the third segment over and onto each other along a line substantially parallel to said longitudinal scored lines, and joining together the second and third segments, applying, along the lateral edges of at least one of the first or third segments, for a width not to exceed the distance between the outer edge of the third segment and the nearest adjacent scored line of the third segment, a means for joining together the first and third segments, folding the first segment and the third segment over and onto each other along a line substantially parallel to said longitudinal scored lines, and joining together the first and third segments, whereby there is formed a unitary, railed slide chart assembly, the first and second segments forming the outer faces of the slide chart assembly, and the third segment being positioned between the faces, those portions of the third segment which lie between the two scored lines of the third segment forming a slide which is positioned between the outer faces and a pair of rails, the pair of rails being formed from the remaining portions of the third segment.

2. A method for producing an article of manufacture suitable for use as a slide chart from an essentially planar sheet having three adjacent segments, a first and second segment forming faces of the article of manufacture and having openings therein, and a third segment having two parallel, scored lines which extend longitudinally along the third segment for a distance less than the length of the third segment, the method comprising:

applying, along the lateral edges of at least one of the second or third segments, for a width not to exceed the distance between the outer edge of the third segment and the nearest adjacent scored line of the third segment, a means for joining together the second and third segments, folding the second segment and the third segment over and onto each other along a line substantially parallel to said longitudinal scored lines, and joining together the second and third segments, applying, along the lateral edges of at least one of the first or third segments, for a width not to exceed the distance between the outer edge of the third segment and the nearest adjacent scored line of the third segment, a means for joining together the first and third segments, folding the first segment and the third segment over and onto each other along a line substantially parallel to said longitudinal scored lines, and joining together the first and third segments, removing sufficient portions of the transverse edges of the folded blank to detach those portions of the third segment which lie between the ends of the parallel, scored lines of the third segment and the transverse edges of the third segment from the remainder of the third segment, whereby there is formed a unitary, railed slide chart assembly, the first and second segments forming the outer faces of the slide chart assembly, and the third segment being positioned between the faces, those portions of the third segment which lie between the two scored lines of the third segment forming a slide which is capable of sliding between the outer faces and a pair of rails, the pair of rails being formed from the remaining portions of the third segment.

3. The method of claim 2 wherein the joining means is applied to the segments of the blank along a path which is parallel to the lateral edges of the three adjacent segments.

4. The method of claim 2 wherein, in folding the second segment and third segment onto each other, the third segment is folded onto the second segment.

5. The method of claim 4 wherein, in folding the first segment and the third segment onto each other, the first segment is folded onto the third segment.

6. The method of claim 5 wherein the second and third segments are separated by a cut scored line, and wherein the cut portions of the cut scored line face outwardly when the third segment is folded onto the second segment.

7. The method of claim 6 wherein the first and second segments are separated by a fold line having a bead, and wherein the bead of the fold line is caused to face inwardly when the first segment is folded onto the third segment.

8. The method of claim 1 wherein the means for joining together the segments is an adhesive.

9. The method of claim 8 wherein the adhesive is applied continuously, essentially along the entire length of those portions of the planar sheet which are to be provided therewith.

10. The method of claim 2 which further comprises, before the first application of a joining means to the planar sheet, cutting the planar sheet from a uniform sheet of material, thereby producing a planar blank, capable of being folded and glued to form a slide chart, which blank is produced from raw sheet material.

11. The method of claim 10 wherein the openings and score lines are produced during the cutting of the planar sheet.

12. The method of claim 11 wherein the openings are positioned in the first and second segments such that the openings in the first segment are not in registry with the openings in the second segment after the article of manufacture has been folded and glued.

13. The method of claim 10 wherein, during the cutting of the planar sheet, a cut scored line is positioned between the second and third segment.

14. The method of claim 13 wherein the cut scored line cuts through approximately one half of the thickness of the planar sheet.

15. The method of claim 13 wherein, during the cutting of the planar sheet, a fold line, having a bead, is positioned between the first and second segment.

16. The method of claim 15 wherein the bead of the fold line, and the cut scored line, are positioned on opposite sides of the planar sheet.

17. The method of claim 10 which further comprises, before the cutting of the planar sheet, printing indicia upon the three segments of the planar sheet which, after assembly of the article of manufacture, will be placed in alignment with each other.

18. The method of claim 2 wherein the width of the portions of the transverse edges that are removed from the article of manufacture is greater than the distance between the end of the parallel scored lines of the third segment and the nearest transverse edge of that third segment.

19. A method for producing an article of manufacture suitable for use as a slide chart from an essentially planar sheet having three adjacent segments, a first and second segment forming faces of the article of manufacture and having openings therein, and a third segment having two parallel, scored lines which extend longitudinally along the third segment for a distance less than the length of the third segment, the method comprising:
applying, along the lateral edges of at least two faces of the three segments, for a width not to exceed the distance between the outer edge of the third segment and the nearest adjacent scored line of the third segment, means for the joining together of segments,
folding the second segment and the third segment over and onto each other along a line substantially parallel to said longitudinal scored lines, and
folding the first segment and the third segment over and onto each other along a line substantially parallel to said longitudinal scored lines, and joining together the three segments,
whereby there is formed a unitary, railed slide chart assembly, the first and second segments forming the outer faces of the slide chart assembly, and the third segment being positioned between the faces, those portions of the third segment which lie between the two scored lines of the third segment forming a slide which is positioned between the outer faces and a pair of rails, the pair of rails being formed from the remaining portions of the third segment.

20. An article of manufacture suitable for use as a slide chart, manufactured from an essentially planar sheet having three adjacent segments, the first and second segments having openings therein, each segment forming a face of the article of manufacture, and the third segment having two parallel scored lines which extend longitudinally along the third segment, the article of manufacture comprising:
a three tiered assembly, the first and third, outer tiers comprising the first and second segments, and the second, middle tier comprising the third segment having scored lines therein,
wherein the first and third tier are connected along one lateral edge by a fold line, said fold line being substantially parallel to said longitudinal scored lines, the second and third tier are connected along one lateral edge by a cut scored line, and wherein the second tier is joined to the first and third tiers along its lateral edges, such that those portions of the second tier which lie between the scored lines of the second tier from a slide, which slide is capable of sliding between the first and third tiers and a pair of rails, the rails being formed by the remaining portions of the third segment.

21. The article of manufacture of claim 20 wherein the only portions of the second tier which are joined to the first and third tier lie between the lateral edges of the second tier and the two parallel scored lines of the second tier.

22. The article of manufacture of claim 20 wherein the fold line separating the first and third tier has a bead which faces inward, toward the center of the article of manufacture.

23. An article of manufacture comprising a unitary, essentially planar sheet, suitable for formation into a slide chart, the sheet being subdivided into three juxtaposed segments, the first and second segments of which are provided with openings therein, each opening being a closed path fully contained within either the first or second segment, and a third segment having two parallel, scored lines which extend longitudinally along the third segment for a distance less than the length of the third segment, the sheet further comprising at least one fold line substantially parallel to said longitudinal scored lines, said fold line being positioned to allow folding of said third segment onto either of said first or second segments.

24. The article of manufacture of claim 23 wherein the segments have strips along which ribbons of glue are capable of being placed, which strips extend in a direction parallel to the lateral edges of the segments.

25. The article of manufacture of claim 23 wherein the third segment is one of the outermost segments.

26. The article of manufacture of claim 25 wherein the third segment is separated from the second segment by a border which is cut scored.

27. The article of manufacture of claim 26 wherein the first and second segment are separated by a fold.

28. The article of manufacture of claim 27 wherein the fold separating the first and second segments has a bead which lies on the side of the planar sheet opposite the side of the sheet which is cut scored.

29. The article of manufacture of claim 23 wherein the scored lines of the third segment are parallel to each other, and to the lateral edges of the third segment.

30. The article of manufacture of claim 23 further comprising additional scored lines, the ends of which extend toward but do not intersect with the transverse edges of the first or second segment.

31. The article of manufacture of claim 30 wherein the additional scored lines curve in a concave direction toward the transverse edges of the first or second segment.

32. The article of manufacture of claim 31 wherein the distance separating the ends of the additional scored lines from the transverse edges of the first and second segments is essentially equal to the distance separating the ends of the scored lines of the third segment from the lateral edges of the third segment.

* * * * *